Figure 1:
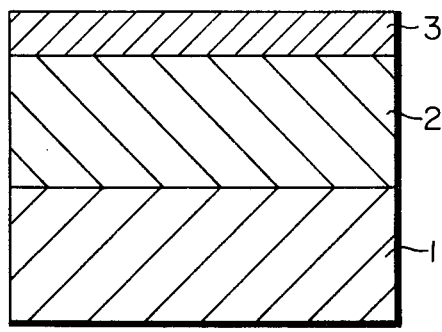

United States Patent [19]

Sugita et al.

[11] 3,932,688

[45] Jan. 13, 1976

[54] COMPOSITE MAGNETIC FILM

[75] Inventors: Yutaka Sugita, Tokorozawa; Tsutomu Kobayashi; Hideki Nishida, both of Tokyo; Masatake Takahashi, Hachioji, all of Japan

[73] Assignee: Hitachi, Ltd., Japan

[22] Filed: Oct. 12, 1973

[21] Appl. No.: 405,839

[52] U.S. Cl. .............. 428/336; 427/132; 428/539; 428/900
[51] Int. Cl.² ........................................ H01F 10/00
[58] Field of Search .......................... 117/234–240; 428/336, 539, 900; 427/127–132

[56] References Cited
UNITED STATES PATENTS
3,645,788   2/1972   Mee et al. ............................ 117/239

OTHER PUBLICATIONS
IBM Tech. Dis. Bull., p. 1461, Vol. 16, No. 5, Oct. 1973, Giess et al.

Nystrom, Vol. 12, No. 12, May 1970, IBM Tech. Dis. Bull., p. 2321.

Ahn, Vol. 14, No. 6, Nov. 1971, IBM Tech. Dis. Bull., p. 1850.

Primary Examiner—Bernard D. Pianalto
Attorney, Agent, or Firm—Craig & Antonelli

[57] ABSTRACT

A polycrystalline film made of a ferromagnetic substance is deposited on a magnetic film to form a composite magnetic film. The composite magnetic film, unlike a conventional single-layered magnetic film made only of a Garnet film, is free from development of hard bubbles and has very excellent characteristics as magnetic film for use in a magnetic bubble device.

17 Claims, 3 Drawing Figures

COMPOSITE MAGNETIC FILM

The present invention relates to a magnetic film for use in a magnetic bubble device, and more particularly to a composite magnetic film in which a polycrystalline film of a ferromagnetic substance is deposited thereon to prevent hard bubbles from being generated.

The application of a magnetic field from the outside normally to the surface of a monocrystalline film having an easy magnetization axis in a direction perpendicular to the surface thereof causes cylindrical magnetic domains to be generated. The diameter of the cylindrical magnetic domain depends on the level of the magnetic field applied. That is, the application of a weak magnetic field causes the domain to become large in diameter and to be transformed to a magnetic domain in the form of a string while the application of a strong magnetic field causes it to become small in diameter, eventually collapsing.

Such a cylindrical magnetic domain is usually termed a magnetic bubble and is permitted to be propagated freely in the monocrystalline film and to be replicated. Further, the magnetic bubble is permitted to be detected with ease by optical means using polarized light or magnetic means using permalloys or Hall elements. For these reasons, the magnetic bubble element is expected for various applications such as sequential memory. For the monocrystalline film serving as the magnetic bubble device which is used to generate and propagate the magnetic bubble there has been generally used a single-layered magnetic Garnet film.

The use of such a single-layered magnetic Garnet film, however, causes not only normal bubbles but also so-called hard bubbles to be generated, thereby to effect normal device operations with very difficulty.

The hard bubble, also termed an abnormal bubble, is different from the normal bubble in that the former has peculiar characteristics such as a complicated wall structure, high bubble collapse field, slow wall mobility, and oblique displacement depending on a bias field gradient.

Accordingly, the existence of such hard bubbles results in difficulty of high speed propagation and in deviation from a propagation circuit, thus providing many unpreferable obstructions from a practical point of view, so that the prevention of the hard bubble from being generated becomes of very importance.

For a method for preventing the hard bubble from being generated there have conventionally been known the two following methods:

The first method is that hydrogen or helium ions are implanted on the surface of the single-layered magnetic Garnet film by an ion implanation method. This causes the magnetic nature on the surface of the magnetic Garnet film to vary to an extent that the complex wall structure is hard to be formed, thereby preventing the generation of the hard bubbles.

The second method is that a magnetic Garnet having a very small saturation flux density is previously epitaxially grown on a non-magnetic substrate to epitaxially grow thereon a desired magnetic Garnet film. This method also causes the magnetic nature of the magnetic Garnet film to vary to an extent that the hard bubbles are hard to be generated.

The first-mentioned method, however, not only requires very large apparatus for effecting the ion implantation but also has the difficulty of fabricating the magnetic film for use as the bubble device having desired characteristics because it is difficult to control the magnetic nature on the surface layer.

The second-mentioned method, on the other hand, has the requirements of effecting the uncontrollable monocrystalline epitaxial growth and of holding three monocrystalline lattice constants of the substrate and the two layers of the magnetic Garnet film in accurate alignment with each other with the great difficulty of the practical formation thereof.

An object of the present invention is to remove the above-mentioned drawbacks of the conventional magnetic film for use in the magnetic bubble device and to provide an improved magnetic film for use in the magnetic bubble device which is free from the fear of generating the hard bubbles and which is formed with ease.

In order to attain the above-mentioned object, the present invention is intended to deposit a polycrystalline ferromagnetic metal film 30 to 500 angstroms thick on the conventional magnetic Garnet film to form a composite magnetic film, thereby permitting the magnetic film for use in the magnetic bubble device free from the fear of generating the hard bubbles to be manufactured with ease without requiring complicated operations such as those of matching the lattice constants.

In accordance with one aspect of the present invention, there is provided a composite magnetic film comprising a magnetic film which has its easy magnetization axis arranged in a direction perpendicular to the surface thereof and in which uniaxial anisotropy is dominant, and a polycrystalline film of ferromagnetic substance deposited as thick as 30 to 500 angstroms on the magnetic film.

Figure 2:
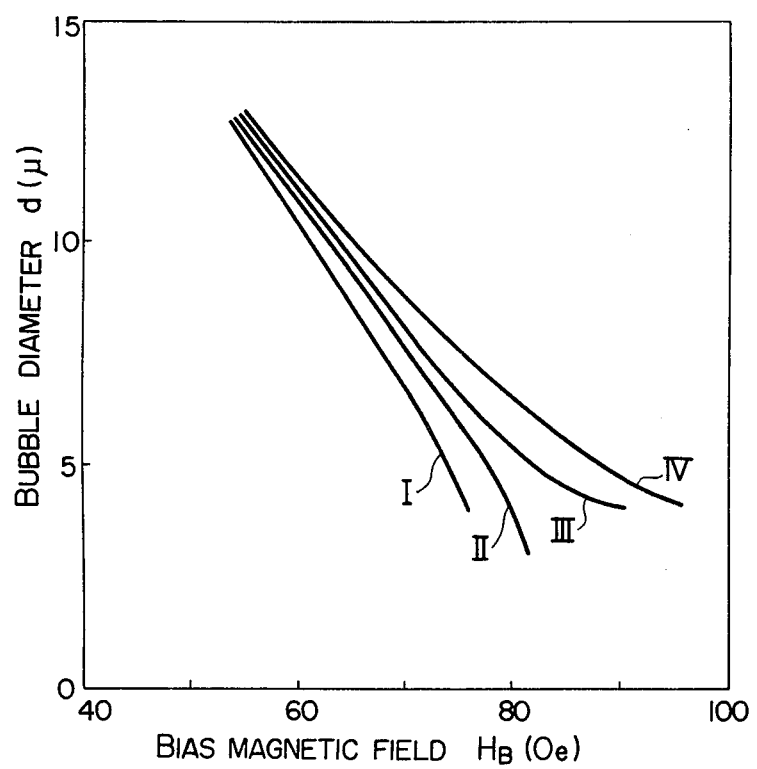
Figure 3:
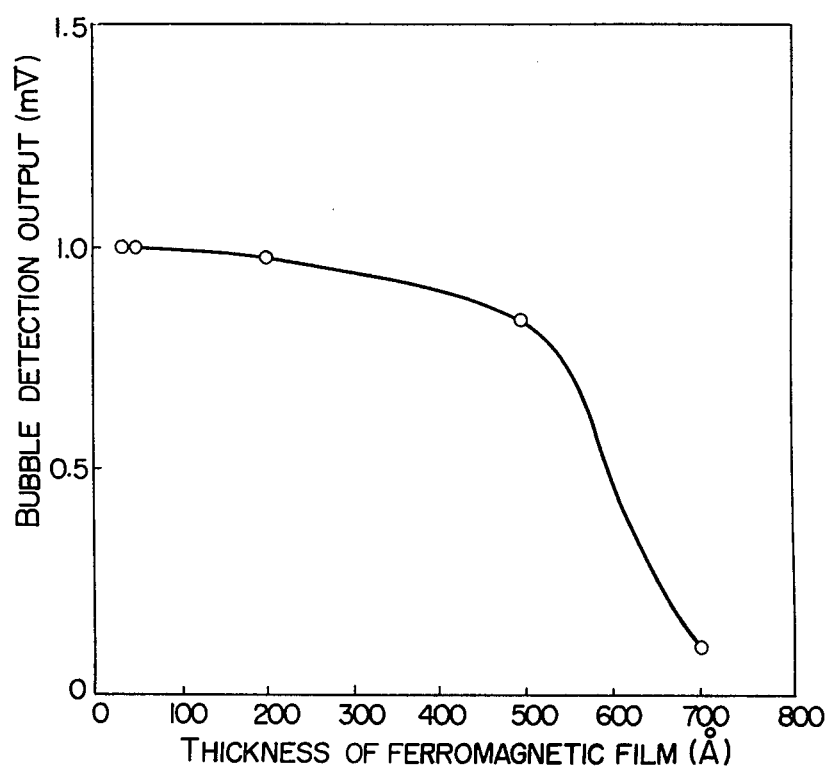

The invention will be more readily understood from the following detailed description illustrated by the accompanying drawings in which:

FIG. 1 is a partial cross-section for illustrating the structure of a composite magnetic film according to the present invention comprising a non-magnetic Garnet film 1, a magnetic Garnet film 2 and a ferromagnetic polycrystalline metal film 3;

FIG. 2 is a graph showing a relation of a bubble diameter in terms of a bias magnetic field in which curve I relates to the normal bubble and curves II to IV relate to the hard bubble; and FIG. 3 is a graph showing a relation of a bubble detection output in the composite magnetic film in terms of the thickness of the ferromagnetic film.

The magnetic wall of a hard bubble is not simply considered as being a rightward or leftward curved simple Bloch wall as a normal bubble but as having a more complicated structure, i.e., such a composite magnetic wall structure as including the rightward or leftward curved Bloch walls in contact with Néel walls to thus form the assembly of many Bloch and Néel walls.

The magnetic wall of such a structure has much greater energy than that of such a simple structure as the normal bubble, so that the molecular contact with other magnetic films having magnetization in the direction of surface of the magnetic film permits the hard bubbles unstable due to their high energy to collapse.

The present invention, based on such a conception, provides a composition magnetic film in which on a monocrystalline magnetic Garnet film there is deposited a polycrystalline ferromagnetic metal film.

This causes exchange coupling to act between magnetization of the magnetic film and that of the ferromagnetic polycrystalline film with the difficulty of formation of the complex magnetic wall resulting in the generation of the hard bubbles, thus preventing them from being generated.

Further, in the present invention, the use of the polycrystalline film made of ferromagnetic substance facilitates the practical manufacturing, thus permitting the composite magnetic film of excellent characteristics to be manufactured with ease with good reproduction.

In other words, in the present invention, the polycrystalline film of ferromagnetic substance has only to be deposited on the magnetic film, thereby dispensing not only with the large-scaled apparatus as in the ion implantation but also with the sophisticated operations such as the epitaxial growth or matching of the lattice constants. In these respects, the object of the present invention is easily attained by simplified means such as vacuum deposition. Generally, for the magnetic film magnetic Garnet films are in the widest use and for the monocrystalline magnetic Garnet films there are used, for example, various compositions such as $(YEu)_3(FeGa)_5O_{12}$, $Y_3(FeGa)_5O_{12}$, $(EuEr)_3(FeGa)_5O_{12}$, $(YGdTm)_3(FeGa)_5O_{12}$ and the like.

The present invention is characterized in that the ferromagnetic polycrystalline film is deposited on the magnetic film by taking advantage of the exchange coupling therebetween, and thus carried out effectively irrespective of the variety of the magnetic film with the similar results even in the use of, for example, an amorphous substance such as Gd—Co or Gd—Fe.

Further, for the ferromagnetic substances deposited on the magnetic film there may be used Ni, Co, Fe, Ni—Co alloys, Ni—Fe alloys, Co—Fe alloys, Ni—Co—Fe alloys, etc. These substances may include therein additives such as Mn in a small amount without obstructions and have their characteristics improved in the presence of the additives.

EMBODIMENT 1

FIG. 1 is a cross-sectional view of a composite magnetic film which was formed in such a way that a magnetic Garnet film 2 of $(YGdTm)_3(FeGa)_5O_{12}$ was grown 5 microns on the (111) plane of a non-magnetic monocrystal 1 by liquid phase epitaxy, and then on 80 Ni—20Fe alloy film 3 was deposited thereon to a thickness of 200 angstroms by vacuum deposition.

FIG. 2, on the other hand, shows a relation of a bubble diameter $d$ in the magnetic Garnet film in terms of a bias magnetic field $H_B$ applied perpendicularly of the surface of the magnetic Garnet film. All the bubbles existing in the thus formed composite magnetic Garnet film were in accordance with curve I without any hard bubble of high collapse field.

On the other hand, a single-layered film of $(YGdTm)_3(FeGa)_5O_{12}$ formed in a similar manner had many kinds of bubbles. That is, in the case of the above single-layered film, the existing bubbles included not only the normal bubble having the characteristic as shown by the curve I but also the bubbles having the characteristics as shown by the curves II to IV.

As will be seen from FIG. 2, the bubbles having the characteristics as shown by the curves II to IV have the greatly enhanced collapse field as compared with the bubble as shown by the curve I, all of them belonging to the hard bubbles, and it will be apparent that the deposition of the Ni-Fe alloy film 3 causes the abnormal bubbles to be prevented from being generated.

EMBODIMENT 2

The composite magnetic film was prepared by changing the thickness of the 80Ni—20Fe ferro-magnetic alloy film in EMBODIMENT 1 to 15, 30, 100, 300, 500, 700, 1000, 3000, and 5000 angstroms, respectively, to examine the presence of the hard bubbles with the result of the generation of only normal bubbles without generating the hard bubbles above the thickness of 30 angstroms.

Next, a propagation circuit and an In—Sb detector were disposed on the surface of the composite magnetic film to propagate and detect the bubbles. FIG. 3 shows a relation of a detection output from the bubbles in terms of the thickness of the 80Ni—20Fe alloy film. The output decreases rapidly when the alloy film exceeds 500 angstroms in thickness. The reason is considered that the thick ferromagnetic alloy film causes the fringing field from the magnetic bubbles to be absorbed to the alloy film to the extent that no bubbles reach the detector.

Accordingly, the thickness of the ferro-magnetic polycrystalline film deposited on the magnetic Garnet film most suitably ranged from 30 to 500 angstroms.

EMBODIMENT 3

The composite magnetic film of the above embodiments was varied with the composition of the ferromagnetic film from 100 % of Ni to 100 % of Fe in substitution for the 80Ni—20Fe alloy with the result of quite the same effects. The results also applied to the Ni—Co, Co—Fe and Ni—Co—Fe alloys.

In the composite magnetic films of the above embodiments, the replacement of the ferro-magnetic metallic film with the non-magnetic metallic films such as Cu, Pt or Au caused the composite magnetic film to have the same magnetic characteristics as those of the single-layered Garnet film without bringing about the effects resulting from the composite film with the result of the generation of the hard bubbles as is the case with the single-layered Garnet film.

It will, therefore, be appreciated that the effect of preventing the generation of the hard bubbles is due to the ferromagnetism of the deposited film.

EMBODIMENT 4

The magnetic Garnet film 2 of $(YGdTm)_3(FeGa)_5O_{12}$ was replaced with that of $(EuEr)_3(FeGa)_5O_{12}$, $Y_3(FeGa)_5O_{12}$, $(YEu)_3(FeGa)_5O_{12}$ with quite the same effects.

EMBODIMENT 5

For the magnetic film there were used one-micron-thick Gd—Fe and Gd—Co amophrous films, on which the ferromagnetic film similar to that of EMBODIMENT 3 was deposited with the same effects with those of EMBODIMENT 3.

As mentioned above, the composite magnetic film according to the present invention generates no hard bubbles and therefore is most suitable for the magnetic film for use in the bubble device.

What is claimed is:

1. A composite free from development of hard bubbles comprising a magnetic bubble domain film capable of forming hard bubbles and having its easy magnetization axis arranged in a direction perpendicular to the surface thereof and in which uniaxial anisotropy is dominant, and a polycrystalline metallic ferromagnetic film deposited on said magnetic film, said polycrystalline film having a thickness of 30 to 500 angstroms.

2. A composite according to claim 1, wherein said ferromagnetic film is formed from at least one selected from the group consisting of Fe, Ni, Co, Fe—Ni alloys, Ni—Co alloys, Fe—Co alloys, and Fe—Ni—Co alloys.

3. A composite according to claim 1, wherein said polycrystalline film is deposited on said magnetic film by vacuum deposition.

4. A composite according to claim 1, wherein said magnetic film is formed on a monocrystalline non-magnetic Garnet substrate.

5. A composite according to claim 1, wherein said magnetic film is a monocrystalline magnetic film.

6. A composite according to claim 1, wherein said magnetic film is formed from at least one amorphous material selected from the group consisting of Gd—Co and Gd—Fe amorphous films.

7. A composite according to claim 2, wherein said magnetic film is a monocrystalline magnetic film.

8. A composite according to claim 7, wherein said magnetic film is formed from a material selected from the group consisting of $(YEu)_3(FeGa)_5O_{12}$, $Y_3(FeGa)_5O_{12}$, $(EuEr)_3(FeGa)_5O_{12}$ and $(YGdTm)_3(FeGa)_5O_{12}$.

9. A composite according to claim 8, wherein said polycrystalline film is formed from an Fe—Ni alloy.

10. A composite according to claim 9, wherein said alloy is an 80Ni-20Fe alloy.

11. The composite according to claim 9, wherein said magnetic film is formed from $(YGdTm)_3(FeGa)_5O_{12}$.

12. A composite according to claim 2, wherein said magnetic film is formed from at least one amorphous material selected from the group consisting of Gd—Co and Gd—Fe.

13. A composite according to claim 12, wherein said polycrystalline film is formed from an alloy of nickel and iron.

14. A composite according to claim 13, wherein said alloy is 80Ni—20Fe.

15. A composite according to claim 2, wherein said magnetic film is formed from at least one amorphous material selected from the group consisting of Gd—Co and Gd—Fe.

16. A composite free from development of hard bubbles comprising a magnetic bubble domain film capable of generating magnetic bubbles including hard bubbles under the influence of an externally applied magnetic field, the easy magnetization axis of said magnetic bubble domain film being arranged in a direction perpendicular to the surface of said film, uniaxial anisotropy being dominant in said magnetic film, and a polycrystalline metallic ferromagnetic film coated on said magnetic film, said polycrystalline film having a thickness of 30 to 500 angstroms and being selected from the group consisting of Fe, Ni, Co, Fe—Ni alloys, Ni—Co alloys, Fe—Co alloys and Fe—Ni—Co alloys.

17. The composite according to claim 16, wherein said magnetic bubble domain film is formed from at least one member selected from the group consisting of amorphous Gd—Co, amorphous Gd—Fe, monocrystalline $(YEu)_3(FeGa)_5O_{12}$, monocrystalline $Y_3(FeGa)_5O_{12}$, monocrystalline $(EuEr)_3(FeGa)_5O_{12}$, and monocrystalline $(YGdTm)_3(FeGa)_5O_{12}$.

* * * * *